United States Patent
Liepold et al.

[11] Patent Number: 5,607,052
[45] Date of Patent: Mar. 4, 1997

[54] MULTIPACK FOR MAGNETIC TAPES WOUND ONTO HUBS

[75] Inventors: August Liepold; Hartmut Thiele; Jose Toral, all of München; Gottfried Lutz, Seefeld; Hermann Brandstetter, München, all of Germany

[73] Assignee: BASF Magnetics GmbH, Mannheim, Germany

[21] Appl. No.: 360,654

[22] PCT Filed: Jun. 18, 1993

[86] PCT No.: PCT/EP93/01555

§ 371 Date: Dec. 22, 1994

§ 102(e) Date: Dec. 22, 1994

[87] PCT Pub. No.: WO94/00844

PCT Pub. Date: Jan. 6, 1994

[30] Foreign Application Priority Data

Jun. 26, 1992 [DE] Germany .............................. 9208555 U

[51] Int. Cl.⁶ .................................................. B65D 85/672
[52] U.S. Cl. ........................ 206/307; 206/394; 206/395; 206/397
[58] Field of Search .................................. 206/389, 391, 206/394, 395, 396, 397, 408, 493, 307

[56] References Cited

U.S. PATENT DOCUMENTS

| 1,889,933 | 12/1932 | Pratt . | |
| 2,327,156 | 8/1943 | Scott | 206/59 |
| 4,081,151 | 3/1978 | Ender et al. | 242/68.5 |
| 4,491,222 | 1/1985 | Garccetta et al. | 206/394 |
| 5,363,962 | 11/1994 | Toral et al. | 206/394 |

FOREIGN PATENT DOCUMENTS

| 475055 | 3/1992 | European Pat. Off. . |
| 993282 | 10/1951 | France . |
| 1004542 | 3/1957 | Germany . |
| 92085555 | 6/1992 | Germany . |
| 506065 | 5/1939 | United Kingdom . |

*Primary Examiner*—Jimmy G. Foster
*Attorney, Agent, or Firm*—Keil & Weinkauf

[57] ABSTRACT

Packaging containers, comprising an at least two-part cardboard blank, for pancakes are described, bottom part and top part containing a central circular clearance, through which a hub sleeve consisting of plastic is inserted. The pancakes are stackably arranged one after the other on said hub sleeve, after which the top part is placed on and then the side parts are folded up. A shrink film is drawn over the entire pack. In this way, the contents of the pack are protected against damage during transit both by the cardboard and by the shrink film. The pack is recyclable or reusable.

4 Claims, 1 Drawing Sheet

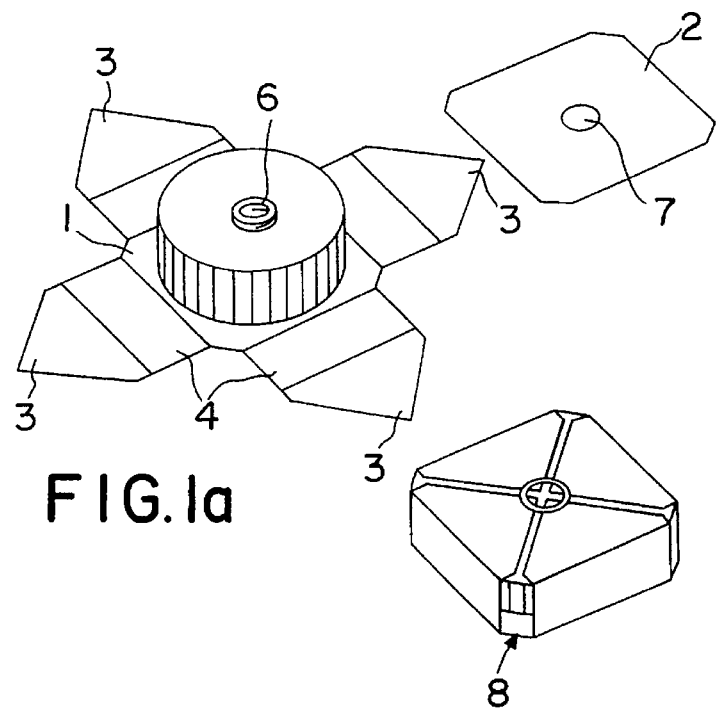
FIG.1a
FIG.1b
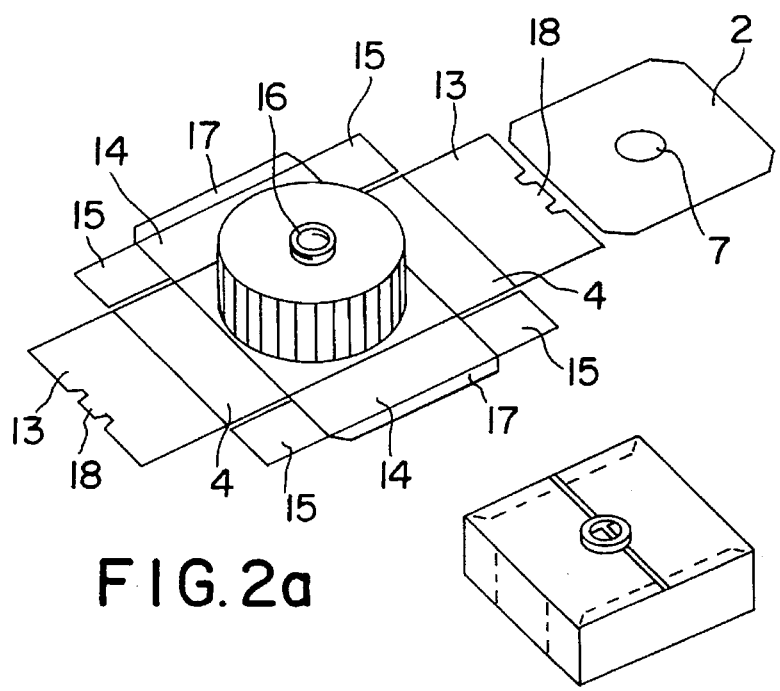
FIG.2a
FIG.2b

MULTIPACK FOR MAGNETIC TAPES WOUND ONTO HUBS

A packaging container composed of at least two blanks of packaging material, of which one comprises a bottom part with side parts joined thereto and the other represents a square top part and the at least two blanks fit over the top part by means of foldable joining tabs of the side parts, for magnetic recording media (known as pancakes) wound onto hubs provided with internal bores, the internal bores of the hubs and also a central clearance of the bottom part and of the top part being penetrated by a one-part cylindrical sleeve which belongs to the packaging container and onto which the pancakes can be stackably fitted.

A packaging container of the abovementioned type is known from EP-A 0 475 055. U.S. Pat. No. 1,889,933 describes a packaging container for wound-up tapes, in which the side parts can be inserted during folding up of the pack into a slit which is adjacent to the upper edge of the sleeve.

Packaging containers of this type are optimal for economic and ecological reasons in comparison with the previously known polystyrene-foam packs in particular because most of the parts are returnable or reusable and because the volume ratio of packaging to contents is considerably better than in the case of the already mentioned polystyrene-foam packs. These aspects play a great part in the shipping of the pancakes, since what are known as pancake packs are sold in large quantities worldwide by the magnetic tape producers. In these packs, the magnetic tape is wound onto hubs, for example flangeless hubs, either what are known as NAB hubs or stackable hubs according to U.S. Pat. No. 4,081,151 or others. These pancakes are packed either individually or in multipacks and covered with a shrink film. The pack known from EP-A 0 475 055 has the following disadvantages:

the packaging materials are large in volume and can be recycled only with difficulty in the individual exemplary embodiments the cardboard blank is of a complicated or voluminous design or else is expensive to produce the joining together of the pack is carried out by adhering or sealing, thus requires an additional operation the sleeve is either of a multipart design or the pack requires special snap elements when joining together.

Therefore, the object was to provide packaging containers of the generic type mentioned above involving as little use of material as possible, in which both the cardboard blank and the hub sleeve are of as simple a construction as possible and the containers are easy to put together.

According to the invention, this object was achieved by substantially right-parallelepipedal packaging containers having the features stated in the defining part of claim 1. Further details of the invention emerged from the subclaims, the description and the drawings.

The invention is explained in more detail below with reference to the drawings, in which:

FIG. 1a shows an embodiment of the packaging container according to the invention in the folded-open state FIG. 1b shows the same pack in the folded-together state FIG. 2a shows a further, particularly preferred embodiment in the folded-open state FIG. 2b shows the same pack in the folded-together state.

As can be seen from FIG. 1a, an embodiment of the packaging container comprises a two-part blank, of which one part (1) forms the bottom part and the side parts and the second part is the top part (2). Both bottom part (1) and top part (2) have a central clearance (7), through which the hub sleeve (6) can be inserted. The cylindrical hub support may, for example, be inserted through the clearance (not drawn) of the bottom part and may contain on its underside a base (likewise not drawn), by which it is fixed in the bottom part. The pancakes are then stacked one on top of the other on the hub support, until approximately the upper edge of the sleeve (6) is reached. Then the top part (2) is placed on and subsequently the tapering ends (3) of the side parts are inserted into four slit-shaped openings running in the circumferential direction on the upper edge of the sleeve (6). The triangular ends of the side parts are connected in one piece with the bottom part (1) as usual by means of bending lines and intermediate parts (4). The hub support, fitted with pancakes, is supported transversely with respect to its center axis in the closed pack by the bottom part (1) on the one hand and by the top part (2) on the other hand. To finish it off, a shrink film is drawn over the entire pack in the usual way, so that, as FIG. 1b reveals, the complete packaging container with the exception of the corner faces (8) is protected by bottom part and top part, the corner faces (8) being shielded, as mentioned above, from outside influences by the shrink film. Instead of the shrink film, one or more strapping bands may also be used. In this case, the packed product may be protected from external influences (dust etc) by a plastic bag before the box is folded together.

A particularly preferred version of the packaging container according to the invention is revealed by FIGS. 2a and 2b. In this case, the side parts (4, 13, 14, 15, 17) are of a substantially rectangular construction, two opposite side parts in each case being identically designed. This version is put together essentially as described above, the fitting of the top part (2) onto the sleeve being followed first of all by folding up the tabs (14, 17) with the respective side flaps (15) and then subsequently folding up the side parts (4, 13), there being provided in each case at the center of the outsides of the side parts (13) an insert part (18), which is separated from the remaining part by notches and is inserted in corresponding slits, of which there are two, at the end of the sleeve (16). Here too, the sleeve is supported as described above. Subsequently, the procedure described above is followed with respect to shrink-enclosing in shrink film or in a wrapping band. The latter version of the pack has the advantage that the contents of the pack are closed on all sides both by the blank and by the shrink film, so that the protection of the packed product is even more optimum.

In a preferred configuration, the bottom part, the top part and the side parts consist of cardboard; the sleeve consists of plastic, for example of polyethylene or polypropylene. In another embodiment, all the parts of the pack according to the invention may consist of plastic.

We claim:

1. A packing container for magnetic recording media wound on annular hubs, said hubs having a central opening, said packing container comprising, a bottom part having four sides and a side portion hingeably connected to each of the sides; each of the side portions having a first portion having a first hingeable connection to one side of the bottom part and a second portion having a second hingeable connection to the first portion;

a cylindrical sleeve having a first end and an opposite end, the sleeve having at least two annular slits adjacent the opposite end, and at least two of said second portions have means for removably engaging said annular slits;

means for connecting the first end of the sleeve to the bottom portion;

a top part having a central opening and a top surface, said central opening defining a space through which the opposite end of the cylindrical sleeve extends when the container is assembled;

wherein, when the container is assembled, the annular hubs are stacked onto the cylindrical sleeve and said cylindrical sleeve penetrates the central opening of said annular hubs; the top part is placed above said annular hubs such that the opposite end of the sleeve extends through said central opening in the top part; said first portions and said second portions are folded along said first and second hingeable connections such that the second portion of each of the side portions contacts the top surface of the top part; and at least two of the second portions are removably engaged with the slits of the sleeve.

2. The packaging container as defined in claim 1 wherein the second portion of each side portion attached to the bottom part is in the shape of a triangle.

3. The packaging container as defined in claim 1, wherein the bottom part and the top part are comprised of cardboard and the sleeve is comprised of hard plastic.

4. A packing container for magnetic recording media wound up onto annular hubs said hubs having a central opening, said packing container comprising:

a bottom with four sides having a side portion hingeably connected to each of the sides; each of the side portions having a first portion hingeably connected to one side of the bottom part, said first portion having side edges perpendicular to the side where the first portion is connected to the side of the bottom, and opposite edges parallel to the side where the first portion is connected to the side of the bottom, a second portion hingeably connected to the opposite edge of each of said first portions, said second portion having opposite edges parallel to the side where the second portion is hingeably connected to said first portion;

each of said side portions further having a match arranged on a parallel side of the bottom part, further defining a first matching side portion pair and a second matching side portion pair;

said first matching side portion pair having side flaps connected to the side edges of the first portion of each of said first matching side portion pair;

a cylindrical sleeve having a first end and an opposite end, said sleeve having at least two annular slits adjacent the opposite end;

means on the opposite edges of the second portion of said second matching side portion pair for engaging said annular slits in said cylindrical sleeve;

means for connecting the first end of the sleeve to the bottom portion;

a top part having a central opening and a top surface;

wherein when the container is assembled, the sleeve is connected to the bottom portion, the annular hubs are stacked onto the cylindrical sleeve, and said cylindrical sleeve penetrates the central opening of said annular hubs, the top part is placed above said annular hubs such that the opposite end of the sleeve extends through said central opening in the top part; the side portions of the bottom part are folded such that the first portions form an inner and outer surface, said inner surface facing the stacked annular hubs;

said side flaps of of said first matching side portion pair are folded such that the second portions of said first matching side portion pair are in contact with the top surface of the top part; and, the second portions of said second matching side portion pair are folded such that the second portions of said second matching side portion pair cover the second portions of the first matching side portion pair and the top surface of the top part, and the opposite edges of said second portion of said second matching side portion are removably engaged within the slits of the sleeve.

* * * * *